(12) United States Patent
Quach

(10) Patent No.: US 7,245,392 B2
(45) Date of Patent: Jul. 17, 2007

(54) METHOD FOR GENERATING A FAX COVER PAGE

(75) Inventor: Tony T. Quach, Anaheim, CA (US)

(73) Assignees: Kabushiki Kaisha Toshiba (JP); Toshiba Tec Kabushiki Kaisha (JP)

( * ) Notice: Subject to any disclaimer, the term of this patent is extended or adjusted under 35 U.S.C. 154(b) by 873 days.

(21) Appl. No.: 10/093,544

(22) Filed: Mar. 8, 2002

(65) Prior Publication Data

US 2003/0169458 A1 Sep. 11, 2003

(51) Int. Cl.
*H04N 1/00* (2006.01)
*G06F 15/00* (2006.01)

(52) U.S. Cl. .................. 358/1.15; 358/401; 358/407

(58) Field of Classification Search ............... 358/1.15, 358/401, 403, 407, 434, 438, 440, 468
See application file for complete search history.

(56) References Cited

U.S. PATENT DOCUMENTS

| | | | |
|---|---|---|---|
| 4,710,886 A | 12/1987 | Heath | |
| 4,943,936 A | 7/1990 | Hirai et al. | |
| 5,008,709 A | 4/1991 | Shinada et al. | |
| 5,058,038 A | 10/1991 | Motoyama et al. | |
| 5,097,417 A | 3/1992 | Ukon | |
| 5,121,468 A | 6/1992 | Daino | |
| 5,175,634 A | 12/1992 | Matsuzaki | |
| 5,196,943 A | 3/1993 | Hersee et al. | |
| 5,204,758 A | 4/1993 | Sakamoto | |
| 5,220,431 A | 6/1993 | Yamaguchi | |
| 5,265,209 A | 11/1993 | Kageyama et al. | |
| 5,267,047 A * | 11/1993 | Argenta et al. | ............. 358/440 |
| 5,287,199 A | 2/1994 | Zoccolillo | |
| 5,412,483 A | 5/1995 | Ludlow et al. | |
| 5,428,459 A | 6/1995 | Asai | |
| 5,438,433 A | 8/1995 | Reifman et al. | |
| 5,448,346 A | 9/1995 | Tabata | |
| 5,493,635 A | 2/1996 | Brindle et al. | |
| 5,504,843 A | 4/1996 | Catapano et al. | |
| 5,537,518 A | 7/1996 | Hasegawa | |
| 5,537,550 A | 7/1996 | Russell et al. | |
| 5,537,626 A | 7/1996 | Kraslavsky et al. | |
| 5,563,713 A | 10/1996 | Sugiura | |
| 5,610,728 A | 3/1997 | Sobue | |
| 5,613,160 A | 3/1997 | Kraslavsky et al. | |
| 5,621,539 A | 4/1997 | Brown et al. | |
| 5,625,466 A | 4/1997 | Nakajima | |

(Continued)

Primary Examiner—King Y. Poon
(74) Attorney, Agent, or Firm—Tucker Ellis & West LLP

(57) ABSTRACT

The present invention provides a method and system for generating a cover page for a fax job. The method comprises the steps of sending a fax job with cover page information to a DID for fax generation and transmittal. The fax job and cover page are suitably separated into two separate jobs prior to submission to the DID. The fax job is then preferably sent to the raster image processor of the DID before the cover page job so that when the cover page job is generated, the number of generated pages has already been determined. After bitmap images are created of both the fax job and cover page job, the fax job and cover page job are suitably swapped and combined into one job such that the cover page job bitmaps precede the fax job bitmaps. After combining the two jobs, the single fax job is suitably sent to a recipient.

8 Claims, 5 Drawing Sheets

U.S. PATENT DOCUMENTS

| | | |
|---|---|---|
| 5,638,495 A | 6/1997 | Arai |
| 5,642,205 A | 6/1997 | Kassmann |
| 5,671,463 A | 9/1997 | Morikawa et al. |
| 5,694,618 A | 12/1997 | Hibino |
| 5,712,712 A | 1/1998 | Sayward |
| 5,719,685 A | 2/1998 | Kimura et al. |
| 5,732,196 A | 3/1998 | Watanabe |
| 5,732,403 A | 3/1998 | Nakamura |
| 5,734,760 A | 3/1998 | Yoshida |
| 5,784,177 A | 7/1998 | Sanchez et al. |
| 5,835,920 A | 11/1998 | Horton |
| 5,860,073 A | 1/1999 | Ferrel et al. |
| 5,911,037 A | 6/1999 | Yoshida |
| 5,923,826 A | 7/1999 | Grzenda et al. |
| 5,930,005 A | 7/1999 | Yoshida |
| 5,956,737 A | 9/1999 | King et al. |
| 5,961,226 A | 10/1999 | Nishida |
| 5,973,791 A | 10/1999 | Yamamuro et al. |
| 5,995,986 A | 11/1999 | Ueda et al. |
| 6,023,714 A | 2/2000 | Hill et al. |
| 6,028,982 A | 2/2000 | Toyoda et al. |
| 6,076,120 A | 6/2000 | Hatayama |
| 6,088,127 A * | 7/2000 | Pieterse ...................... 358/407 |
| 6,088,138 A | 7/2000 | Sakai et al. |
| 6,088,702 A | 7/2000 | Plantz et al. |
| 6,108,676 A | 8/2000 | Nakatsuyama |
| 6,141,705 A | 10/2000 | Anand et al. |
| 6,144,974 A | 11/2000 | Garland |
| 6,161,114 A | 12/2000 | King et al. |
| 6,163,784 A | 12/2000 | Taguchi |
| 6,172,763 B1 | 1/2001 | Toyoda et al. |
| 6,208,427 B1 | 3/2001 | Lee |
| 6,243,721 B1 | 6/2001 | Duane et al. |
| 6,247,028 B1 | 6/2001 | Torisaki |
| 6,247,135 B1 | 6/2001 | Feague |
| 6,269,380 B1 | 7/2001 | Terry et al. |
| 6,327,387 B1 | 12/2001 | Naoi et al. |
| 6,327,599 B1 | 12/2001 | Warmus et al. |
| 6,330,071 B1 | 12/2001 | Vidyanand |
| 6,338,076 B1 | 1/2002 | Hidding et al. |
| 6,343,197 B1 | 1/2002 | Serizawa et al. |
| 6,411,685 B1 * | 6/2002 | O'Neal ...................... 379/88.14 |

\* cited by examiner

METHOD FOR GENERATING A FAX COVER PAGE

BACKGROUND OF THE INVENTION

This invention pertains generally to digital imaging devices, and more particularly to a method for generating a cover page for a facsimile transmission.

Digital imaging devices ("DID") are complex machines that often perform a plurality of functions. DIDs suitably include devices such as printers, fax machines, scanners, copiers, multi-functional peripherals ("MFPs"), and other like peripheral devices. In addition, DIDs are suitably connected to a network or directly to computer. When a user at a computer communicates with a DID, either directly or over a network, at DID device driver is accessed which is linked both to the computer operating system ("OS") and the DID. Device drivers are pieces of software that enable computers to communicate with peripheral devices. In doing so, they are responsible for accessing hardware registers of the device. Device drivers often form part of the lowest level of an operating system ("OS") kernel, with which they are linked when the kernel is built. OS also accept loadable device drivers that can be installed after the OS is running.

In the case where the DID performs fax functions, the fax properties of the DID for a fax job are suitably set through a fax driver stored on a computer. These fax properties suitably include whether or not a cover sheet is generated by the fax driver and DID. In addition, if a cover sheet is to be generated, the fax properties suitably include the particular information to be included on the fax cover sheet. The various options for cover sheet information selection can cause the cover sheet for a fax to become two or more sheets, depending on the information on the cover sheet. Consequently, when a document is sent from a computer to a DID processing, the total number of pages of the document and cover sheet combination suitably varies. It would be preferable if the fax driver and DID were capable of determining the total number of pages of the document and cover sheet combination.

Furthermore, when a fax job is generated from a software program (i.e. spreadsheet software, word processing software, text editors, etc.) on a computer ("PC fax) the software program does not necessarily calculate the number of pages to be printed. Consequently, the number of pages to be printed in the fax document may not be determined when a fax driver sends a fax to a DID for processing. Therefore, generating a fax cover sheet that includes a number representing the number of pages in the fax document to which the cover sheet corresponds is problematic. It would be preferable if the fax driver and DID were capable of generating the total number of pages of the fax document regardless of the software program from which the fax job originated.

SUMMARY OF THE INVENTION

In accordance with the present invention, there is provided a method for sending a facsimile transmission. The method suitably comprises sending a first fax job corresponding to a fax document to a fax controller and sending a second fax job corresponding to a fax cover sheet to the fax controller. The method further comprises receiving the first fax job and second fax job at the fax controller and then generating processed images of the first fax job and of the second fax job. The processed images are then suitably combined such that the processed images of the second fax job precede the processed images of the first fax job. After combining the processed images into a single fax job, the fax job is suitably sent to a recipient.

Also in accordance with the present invention, there is preferably provided a system for generating a cover page for PC faxing in a network environment.

DETAILED DESCRIPTION OF THE INVENTION

Figure 1:
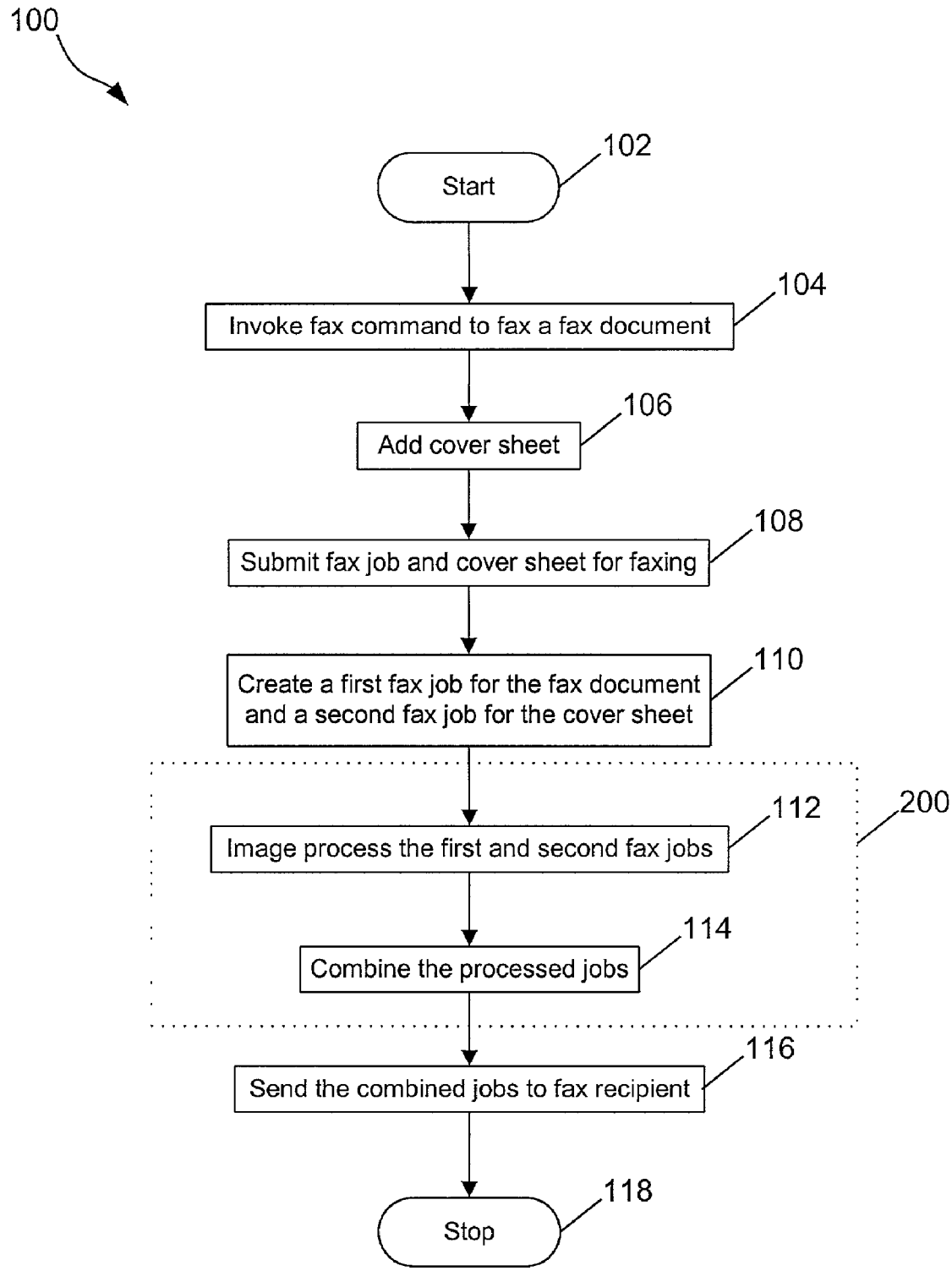
FIG. 1 is a flow chart representing the general process for faxing a document and a cover sheet according to the present invention.

Turning now to FIG. 1, a flowchart generally depicting a process for faxing a document and a cover sheet in accordance with the present invention is provided. The general flow 100 commences at start block 102 and continues to process block 104. At process block 104, a user invokes a fax command to fax a fax document. Progression then flows to process block 106 where the user adds a cover sheet to the fax job. Flow continues to process block 108 where the fax job is submitted for faxing. Flow progresses to process block 110 where the fax job is separated into two fax jobs, a first fax job for the fax document and a second fax job for the cover sheet. Progression then continues to process block 112 where the first and second fax jobs are image processed. Flow then progresses to process block 114 where the image processed jobs are combined into a single fax job. Flow then continues to process block 116 where the single combined fax job is sent to a recipient, after which progression flows to termination block 118.

Figure 2:
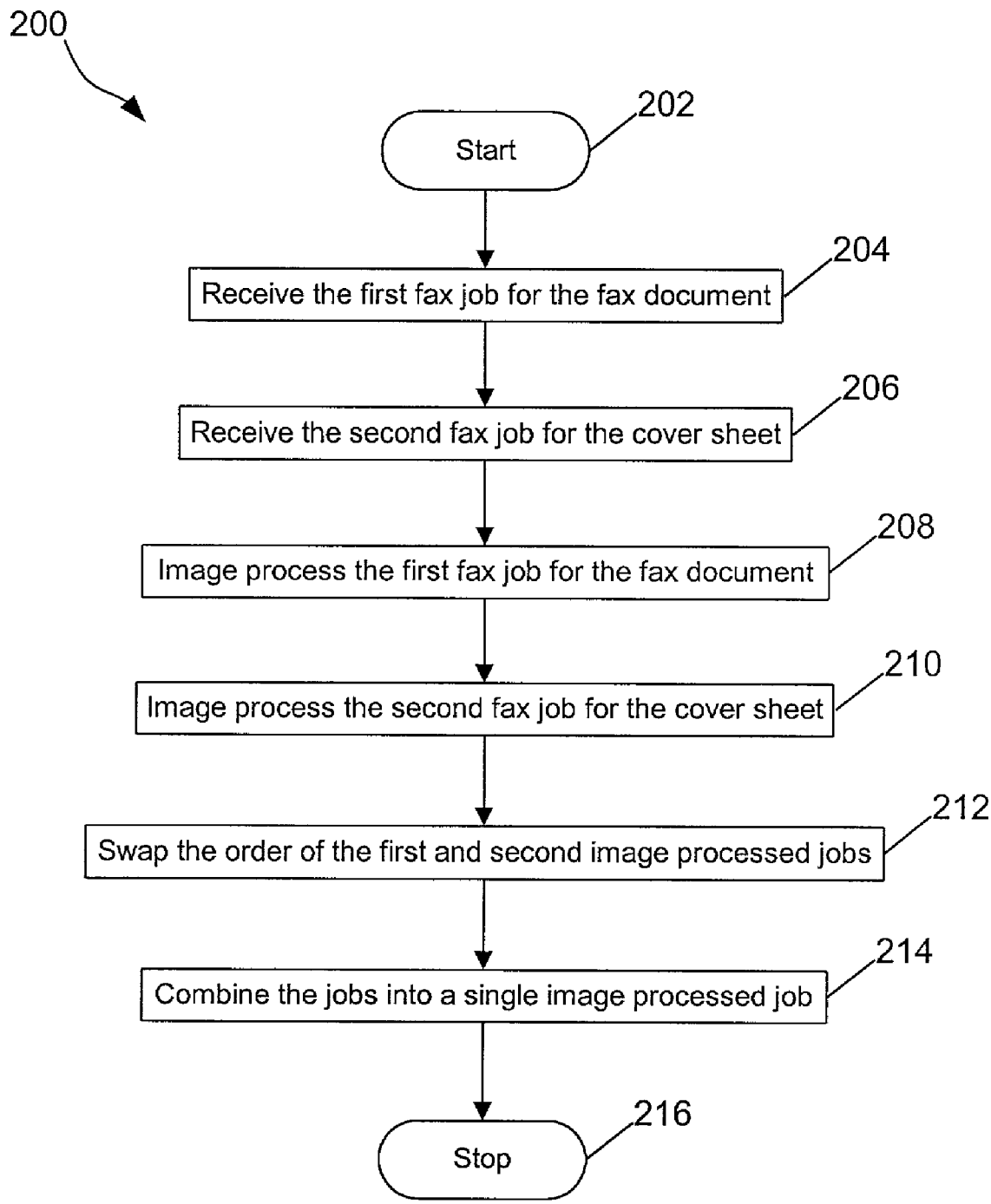
FIG. 2 is a flow chart representing the procedure for processing, organizing and preparing a single fax job from two received fax jobs, a first corresponding to a fax document and a second corresponding to a cover page.

Turning now to FIG. 2, a flowchart is provided representing a procedure for processing, organizing and preparing in accordance with the present invention a single fax job from a first received fax job corresponding to a fax document a second received fax job corresponding to a cover page. The general flow of the combination process 200 commences at start block 202 and continues to process block 204. At process block 204, a first fax job corresponding to a fax document is received. Progression then flows to process block 206 where a second fax job corresponding to a cover sheet is received. Flow continues to process block 208 where the first fax job is image processed. Flow progresses to process block 210 where the second fax job is image processed. Progression then continues to process block 212 where the order of the first and second image processed jobs is swapped. Flow then progresses to process block 214 where the image processed jobs are combined into a single fax job, after which progression flows to termination block 216.

Figure 3:
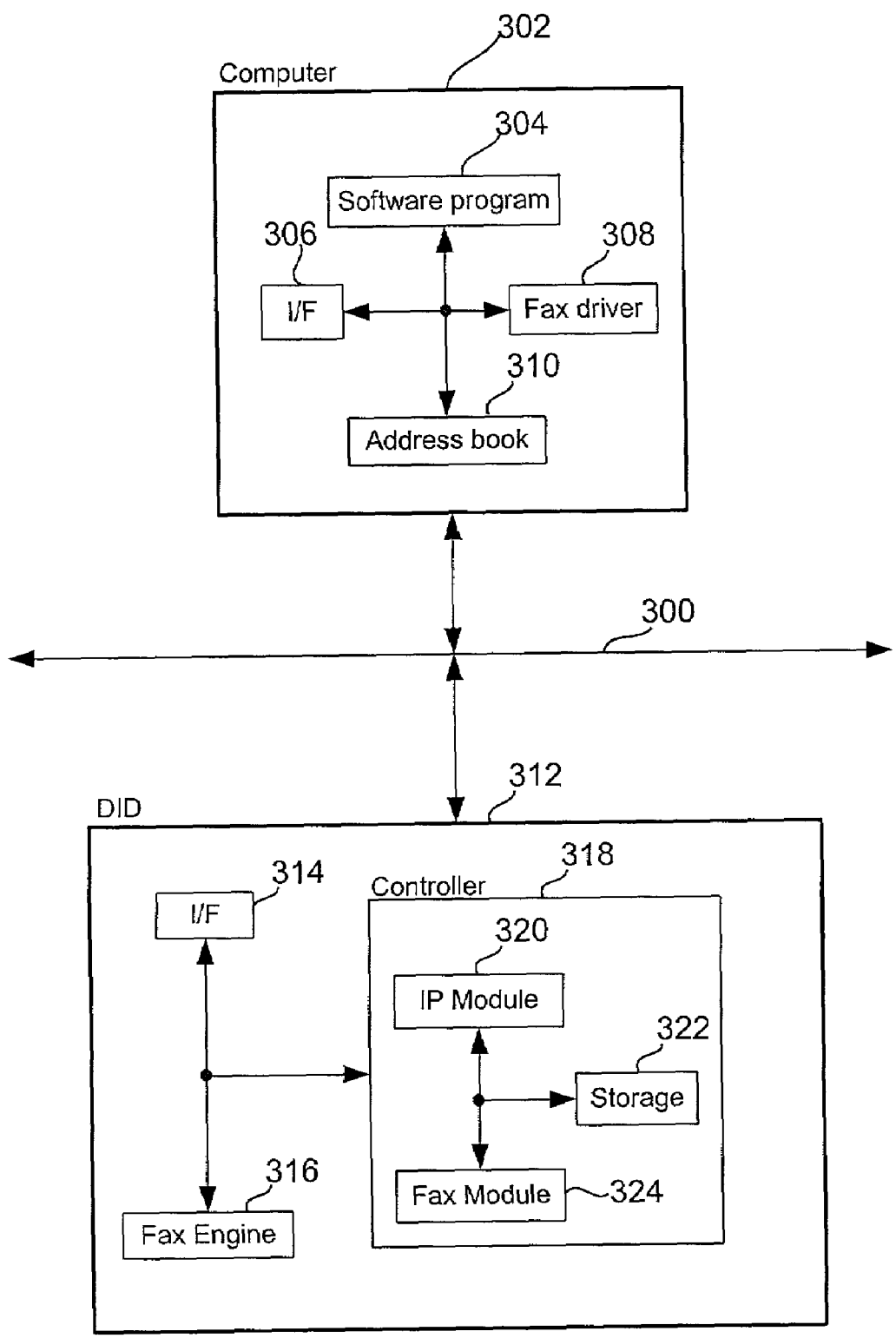
FIG. 3 is a diagram representing a presently preferred embodiment of network system for faxing a document and a cover page according to the present invention.

Turning now to FIG. 3, a system diagram illustrating a DID in a network environment for faxing a document and cover page in accordance with the present invention is provided. The data transport network 300 is illustrative of a LAN or WAN environment in which a preferred embodiment is provided. Connected to a data transport network 300 are a computer 302 and a DID 312. The data transport network 300 is suitably any network and is suitably comprised of physical and transport layers such as illustrated by a myriad of conventional data transport mechanisms such Ethernet, Token-Ring™, 802.11(b), or other wire-based or wireless data communication mechanisms as will be apparent to one of ordinary skill in the art. The DID 312 is in data communication with a data transport network 300 through a network interface 314. The data transport network 300 is also placed in data communication with the computer 302 through network interface 306. Thus, a data path between DID 312 is in shared data communication with computer 302. It should be noted that while the preferred embodiment of the present invention is a network system having a computer and a DID, the present invention includes systems having a DID and computer connected directly to one another through a port such as a parallel port, serial port, USB port, or any other data transport mechanism as will be apparent to one of ordinary skill in the art.

The computer 302 is suitably any type of computer, but is preferably a PC running an on a Windows, Unix, Macintosh, or Linux based operating system. The computer 302 is suitably a thin client or a thick client. The computer 302 is preferably equipped with a software program 304, a fax driver 308, and a network interface 306. In addition, the computer 302 suitably comprises an address book 310 stored on internal storage or is data communication with a server, DID, or computer upon which an address book 310 is stored. For embodiments where the computer 302 is a thin client, any or all of the software program, fax driver, and address book are suitably stored on a server, the DID, or other device connected to the data transport network 300.

In the presently preferred embodiment, a user invokes a fax command from a software program 304 on a computer 302 to initiate the faxing procedure. The user is suitably a client, network administrator, developer or any person with access to the DID 312. In addition, the initiation of document faxing procedures is suitably enabled by an automated process or software program, such as maintenance or automation software. It should be understood that the software program 304 is not limited to any particular application of type of application. The software program is suitably any type of program, including office suite software, text editors, or even the operating system itself, e.g. printing from a DOS environment.

In a presently preferred embodiment, a user invokes a fax command by selecting a "fax" command from a menu of command options. When a fax command is executed, the current file, screen becomes the fax document. Optionally, a user suitably invokes a fax command via a keyboard, such as may be required in a text-based user interface, or by executing a "hotkey," or via a mouse or other user input device, as will be appreciated by one skilled in the art. When a fax command is executed from a software program 304, the fax driver 308 is accessed. The fax driver 308 causes a fax properties window of the type shown in FIG. 4A to open. While the presently preferred embodiment employs a properties selection window or box, it is within the scope of this invention for a fax properties selection mechanism to be of any form as will be appreciated by those skilled in the art.

Figure 4A:
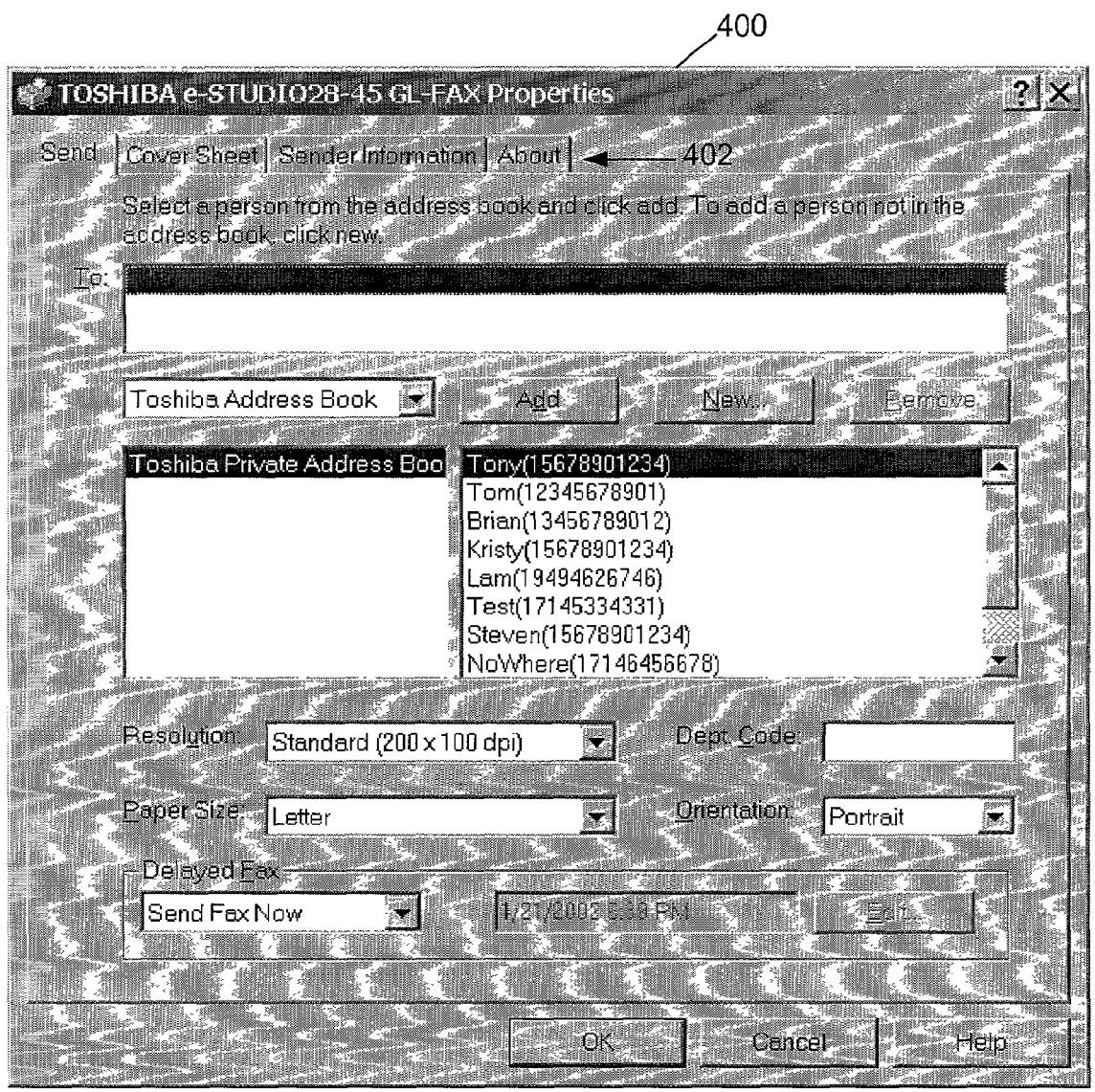
FIG. 4A is an example of a screen associated with a fax driver for selecting fax properties for faxing a document.

In a preferred embodiment, the fax driver 308 activates a fax properties window 400. Furthermore, the properties window 400 preferably has a plurality of tabs 402 for selecting groups of properties. Preferably, upon selecting one of the tabs 402 a recipient for the fax is suitably selected from an address book. Other properties, such as resolution, paper size, department code, paper orientation, and fax scheduling are also suitably selected as is shown in FIG. 4A. The address book is suitably a local address book 310 on the computer 302, or any address book accessible by the computer 302 over data transport network 300.

Figure 4B:
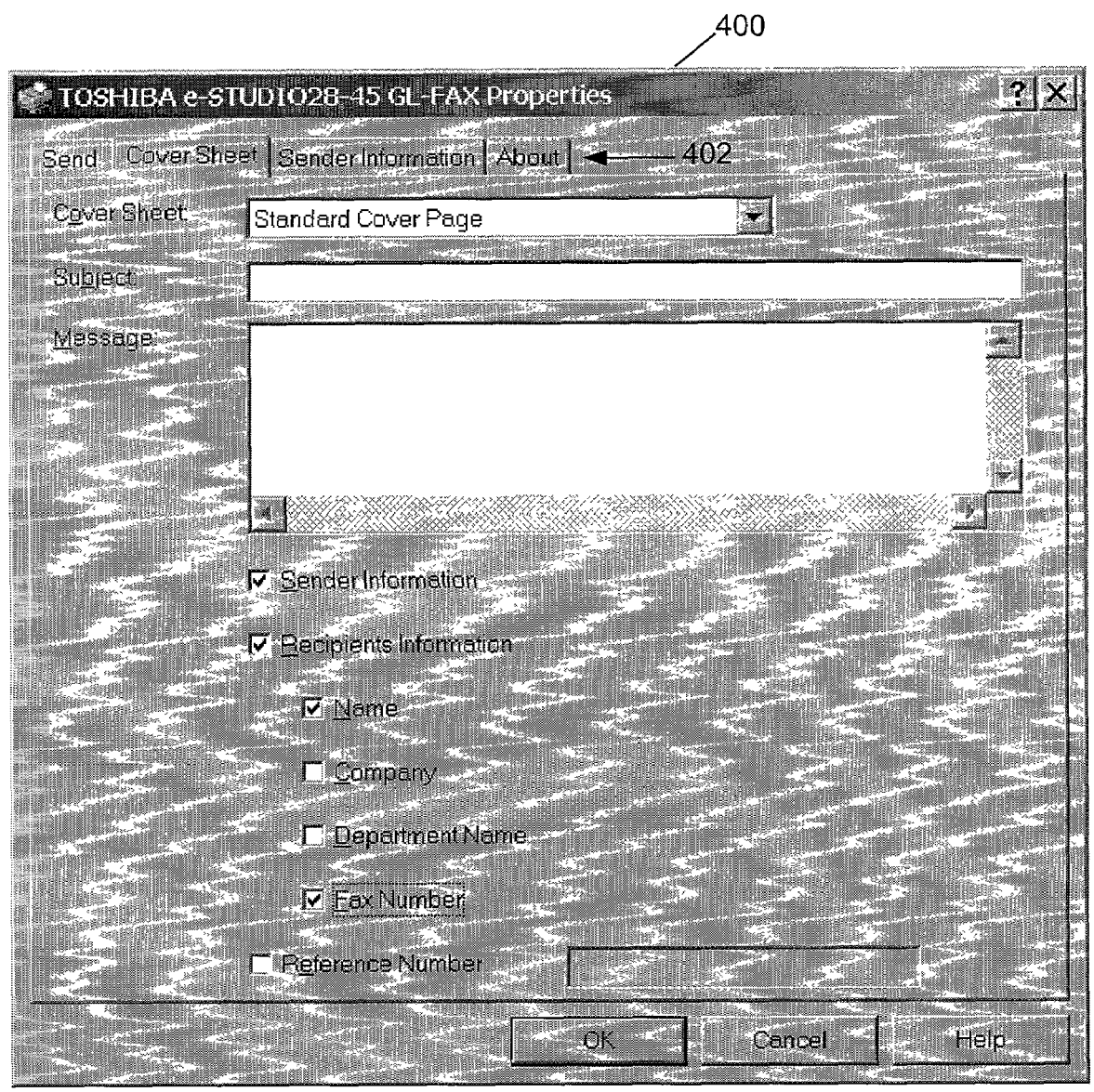
FIG. 4B is an example of a screen associated with a fax driver for selecting cover sheet information for faxing a cover sheet with a fax document.

In addition, upon selecting another one of the tabs 402, information for a cover sheet to be included with the fax document is suitably selected. As shown in FIG. 4B, such information suitably comprises the type of cover sheet, the subject, a message, sender information, reference information, or recipient information, which suitably comprises recipient name, company, department name, or fax number. While there is no selectable property shown in FIGS. 4A and 4B for a number of pages, the fax cover sheet preferably lists the number of pages included in the fax document.

After the fax properties are selected, the fax driver 308 suitably prepares the fax document and cover sheet for faxing. Preferably, the fax driver 308 creates two fax jobs, a first fax job for the fax document and a second fax job for the fax cover sheet. The fax driver 308 suitably sends the first fax job and then the second fax job to the DID 312 through network interface 306, across data transport network 300, through network interface 314 and to the controller 318. The fax driver 308 preferably transmits the first and second fax jobs in non-bitmap image form.

After receipt of the non-bitmap image fax jobs, the image processor 320 of the controller 318 processes the fax jobs to convert them to image files as will be apparent to one skilled in the art. In the presently preferred embodiment, the image processor 320 is a raster image processor. The fax document job is preferably image processed before the fax cover page job. The controller 318 then preferably determines the number of pages in the fax document job after the image processor 320 processes the job. Upon determining the number of pages, the controller 318 preferably inserts a reference to the number of pages of the fax document into the non-bitmap image form fax cover sheet job before the fax cover sheet job is image processed. The image processor 320 then processes the fax cover page.

After both the fax document and fax cover page jobs are image processed by the image processor 320, the controller 318 preferably combines the processed jobs. The processed jobs are preferably combined such that the second job, the fax cover page, maintains its internal order but precedes the first job, the fax document. For example, if a ten page fax document is sent with a two page cover sheet, the two page cover sheet is essentially added to the front of the ten page fax document to form a single twelve page fax job.

After combining the two image processed jobs into a single image processed fax job, the controller preferably sends the fax job to storage 322 pending scheduling and fax device availability. The storage 322 is preferably a fax queue. The controller suitably enqueues and dequeues image processed fax jobs through scheduling as will be appreciated by one who is skilled in the art.

A dequeued fax job is suitably sent by the controller fax module 324 to the fax engine 316, where the image processed fax job is suitably transmitted to a recipient.

Although the preferred embodiment has been described in detail, it should be understood that various changes, substitutions, and alterations can be made therein without departing from the spirit and scope of the invention as defined by the appended claims. It will be appreciated that various changes in the details, materials and arrangements of parts, which have been herein described and illustrated in order to explain the nature of the invention, may be made by those skilled in the area within the principle and scope of the invention as will be expressed in the appended claims.

What is claimed is:

1. A system for generating a network facsimile cover page comprising:
   a facsimile driver on an associated workstation, the facsimile driver including,
   means adapted for receiving electronic document data associated with a facsimile output;
   means adapted for receiving a cover sheet request, which cover sheet request is associated with a facsimile output;
   means adapted for communicating the electronic document, via an associated network, to an document output controller;
   means adapted for communicating cover sheet document data corresponding to a received cover sheet request via the associated network to the document output controller;
   a document output controller including,
   means adapted for receiving from the facsimile driver, via the associated network, the electronic document data;
   means adapted for receiving, from the facsimile driver and via the associated network, the cover sheet document data associated with received electronic document data;
   means adapted for rendering the electronic document data;
   means adapted for rendering the cover sheet document data;
   means adapted for generating page count data in accordance with at least rendered electronic document data;
   means adapted for appending page count data into rendered cover sheet document data such that a page count is reflected therein;
   combining means adapted for combining received electronic document data with received cover sheet document data into a facsimile output file; and
   means adapted for communicating the facsimile output file to at least one destination such that a cover sheet corresponding to the cover sheet document data precedes document data corresponding to the electronic document data in a rendering therefrom.

2. The system for generating a network facsimile cover page of claim 1 wherein the page count data is inserted into the cover sheet document data prior to communicating the facsimile output file to at least one destination.

3. The system for generating a network facsimile cover page of claim 1 wherein the facsimile driver further includes means adapted for receiving parameters for the facsimile output.

4. The system for generating a network facsimile cover page of claim 3 wherein the parameters include recipient address data, resolution, paper size, paper orientation, and delivery time data.

5. A method for generating a network facsimile cover page comprising the steps of:
   receiving, at a facsimile driver, electronic document data associated with a facsimile output;
   receiving, at the facsimile driver, a cover sheet request, which cover sheet request is associated with a facsimile output;
   communicating the electronic document data from the facsimile driver via an associated network to a document output controller;
   communicating cover sheet document data corresponding to a received cover sheet request from the facsimile driver via the associated network to the document output controller;
   rendering, at the document output controller, the electronic document;
   rendering, at the document output controller, the cover sheet document data;
   generating, at the document output controller, page count data in accordance with at least rendered electronic document data;
   appending page count data, at the document output controller, into rendered cover sheet data such that a page count is reflected therein;
   combining, at the document output controller, received electronic document data with received cover sheet document data into a facsimile output file; and
   communicating the facsimile output file from the document output controller to at least one destination such that a cover sheet corresponding to the cover sheet document data precedes document data corresponding to the electronic document data in a rendering therefrom.

6. The method for generating a network facsimile cover page of claim 5 wherein the page count data is inserted into the cover sheet document data prior to communicating the facsimile output file to at least one destination.

7. The method for generating a network facsimile cover page of claim 5 wherein the facsimile driver further includes means adapted for receiving parameters for the facsimile output.

8. The method for generating a network facsimile cover page of claim 7 wherein the parameters include recipient address data, resolution, paper size, paper orientation, and delivery time data.

* * * * *